United States Patent
Chung et al.

(10) Patent No.: US 7,257,721 B2
(45) Date of Patent: Aug. 14, 2007

(54) SYSTEM AND METHOD OF POWER MANAGEMENT

(75) Inventors: Chien-Ping Chung, XinZhuang (TW); Chung-Ching Huang, XinZhuang (TW); Jing-Rung Wang, Taipei (TW)

(73) Assignee: VIA Technologies, Inc., Taipei (TW)

( * ) Notice: Subject to any disclaimer, the term of this patent is extended or adjusted under 35 U.S.C. 154(b) by 395 days.

(21) Appl. No.: 10/963,149

(22) Filed: Oct. 12, 2004

(65) Prior Publication Data

US 2006/0031690 A1 Feb. 9, 2006

(30) Foreign Application Priority Data

Aug. 3, 2004 (TW) .............................. 93123194 A

(51) Int. Cl.
G06F 1/00 (2006.01)
(52) U.S. Cl. ...................................... 713/300
(58) Field of Classification Search ................ 713/300, 713/322
See application file for complete search history.

(56) References Cited

U.S. PATENT DOCUMENTS

2002/0087896 A1* 7/2002 Cline et al. .................. 713/300
2004/0039954 A1* 2/2004 White et al. ................. 713/322
2005/0132238 A1* 6/2005 Nanja .......................... 713/300

FOREIGN PATENT DOCUMENTS

CN 1492299 * 4/2004

* cited by examiner

Primary Examiner—Thomas Lee
Assistant Examiner—Sean Weinman
(74) Attorney, Agent, or Firm—Thomas, Kayden, Horstemeyer & Risley

(57) ABSTRACT

A system and method for power management in computer systems. System status assessed by a Northbridge, and the result transferred to a Southbridge. A system control table is provided in the Southbridge, whereby power management without software control is provided.

11 Claims, 3 Drawing Sheets

| Working State | Voltage | Frequency |
|---|---|---|
| High | +5% | +10% |
| Normal | +0% | 0% |
| Low | -5% | -10% |
| Very Low | -10% | -50% |
| ⋮ | | |

State Control Table

FIG. 3

SYSTEM AND METHOD OF POWER MANAGEMENT

BACKGROUND

The invention relates to power management in computer systems, and in particular, to a method and system for regulating power consumption in computer systems through system management bus (SMBUS).

Power consumption is an important concern in computer systems, particularly in mobile computers using batteries. The Advanced Configuration and Power Interface (ACPI) standard, implemented in computer systems for managing power consumption, provides architecture shown in FIG. 1.

ACPI is implemented through cooperation between hardware and software. According to the design, power management is accomplished by delivering commands from the operating system to the hardware through drivers and the system management bus (SMBUS), and power consumption reduced by decreasing the operating voltage and frequency accordingly. FIG. 1 shows a conventional system architecture comprising a software layer 101, a hardware layer 103 and an ACPI layer 112 therebetween. The operating system 104 in software layer 101 comprises an Operating System Power Management (OSPM) API, labeled 106 in the figure. The OSPM 106 is executed to assess utilization of an application 102, and regulate power consumption accordingly. Thus a corresponding power management command is delivered to the ACPI layer 112 through device drivers 108 and ACPI driver 110 and is transmitted to the hardware layer 103 through SMBUS 128.

The ACPI layer 112 architecture comprising programs, control tables and ACPI registers resides between the hardware and software layers. In hardware layer 103, the power management command is received by the Southbridge 124, and transferred to voltage controller 122 and frequency generator 126 through System Management Bus (SMBUS) 128 to control voltage and frequencies. Based on the power management command, the voltage controller 122 can adjust operating voltage of Central Processing Unit (CPU) 114, Accelerated Graphics Port (AGP) 116 and memory 120, and the frequency generator 126 generates corresponding operating frequencies for each of the system components.

When hardware performance is decreased to reduce power consumption, however, software-driven power management efficiency is compromised and reliability suffers, due to the software's is reliance on hardware for execution. For example, when CPU 114 enters state C3, data in CPU 114 is lost, data in the cache loses consistency, and the system is unable to handle master requests and interrupt requests. A considerable number of clock cycles are required to recover from the state C3, such that the software power management system is unable to reflect hardware utilization in real-time, thus reducing power consumption efficiency.

SUMMARY

An embodiment of the invention provides a power management method for regulating power consumption in computer systems without software protocols. The computer system comprises a plurality of internal components, and the method comprises the following steps. A state control table is provided for defining relationship between a plurality of work states and a plurality of control signals. Utilization of an internal component is detected and categorized into a corresponding work state. The work state is looked up in the state control table to generate a control signal delivered to adjust the utilization in the internal component.

The state control table can be a voltage control table, whereby the control signal is delivered to adjust a voltage driving the internal component. Alternatively, the state control table can be a frequency control table such that the control signals are delivered to adjust operating frequency of the internal component. The control signal is delivered through a system management bus (SMBUS), and the internal component is a central processing unit, a memory device or an accelerated graphics port.

Also provided is a power management system comprising a first chip, a second chip, a system management bus and a controller. The first chip assesses utilization of an internal component, and the second chip comprises a state control table to generate a control signal according to the utilization. The system management bus is capable of delivering the control signal and the controller adjusts the utilization of the internal component accordingly.

The first chip is a Northbridge, the second chip is a Southbridge, and the system management bus conforms to Advanced Configuration and Power Interface standard. The second chip reads predetermined configurations in firmware to establish the state control table.

BRIEF DESCRIPTION OF THE DRAWINGS

The following detailed description, given by way of example and not intended to limit the invention solely to embodiments described herein, will best be understood in conjunction with the accompanying drawings, in which:

FIG. 3 is a state control table according to an embodiment of the invention.

DETAILED DESCRIPTION OF THE INVENTION

As the Southbridge is the key component utilized for system frequency and voltage control, power consumption can be reduced by manipulation thereof, thus an automatic frequency and voltage control mechanism can be added as an extension to perform real-time power management. Active power management via the Southbridge can be more precise and faster than passive software control.

Figure 1:
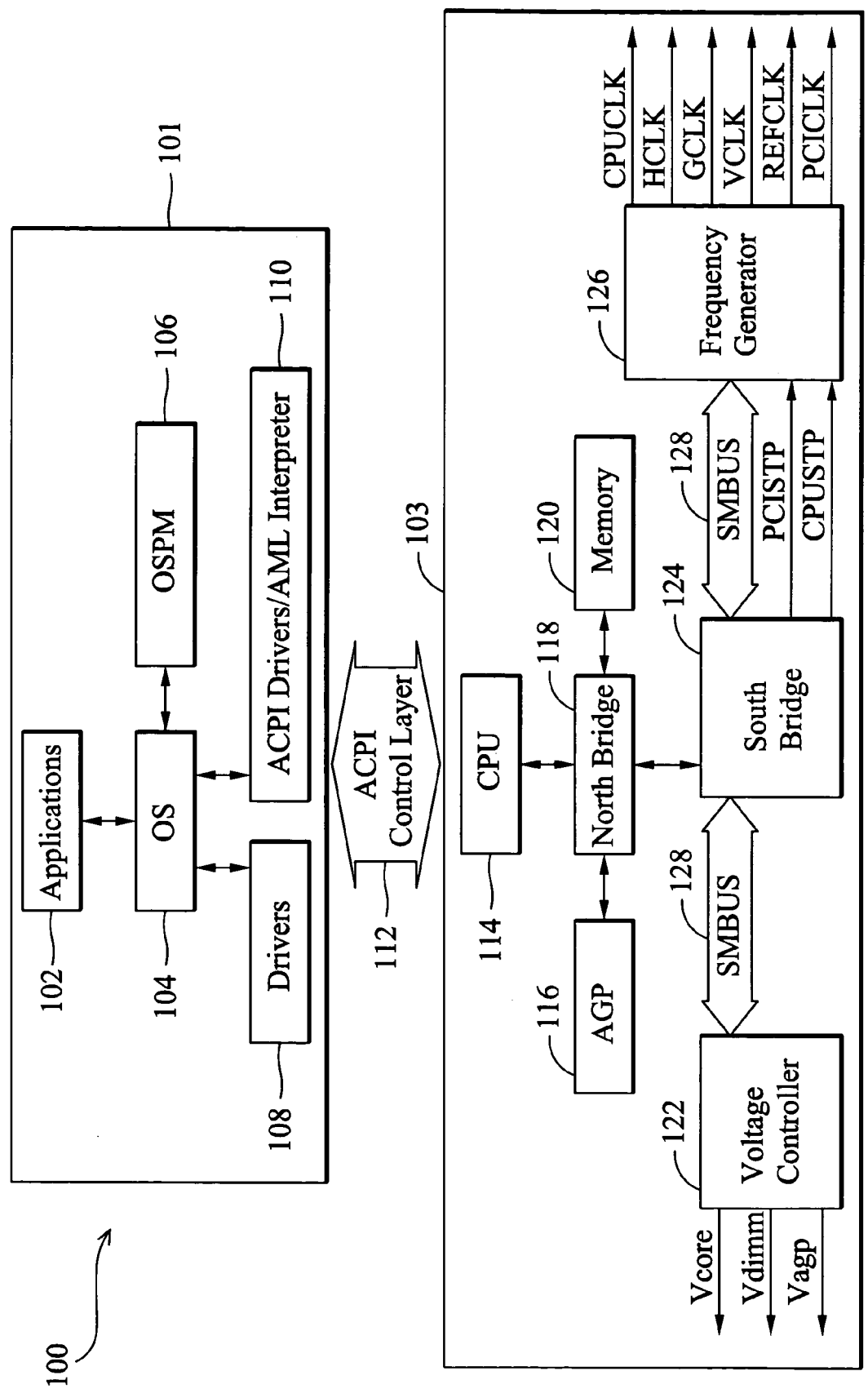
FIG. 1 is a block diagram of a conventional computer system 100.
Figure 2:
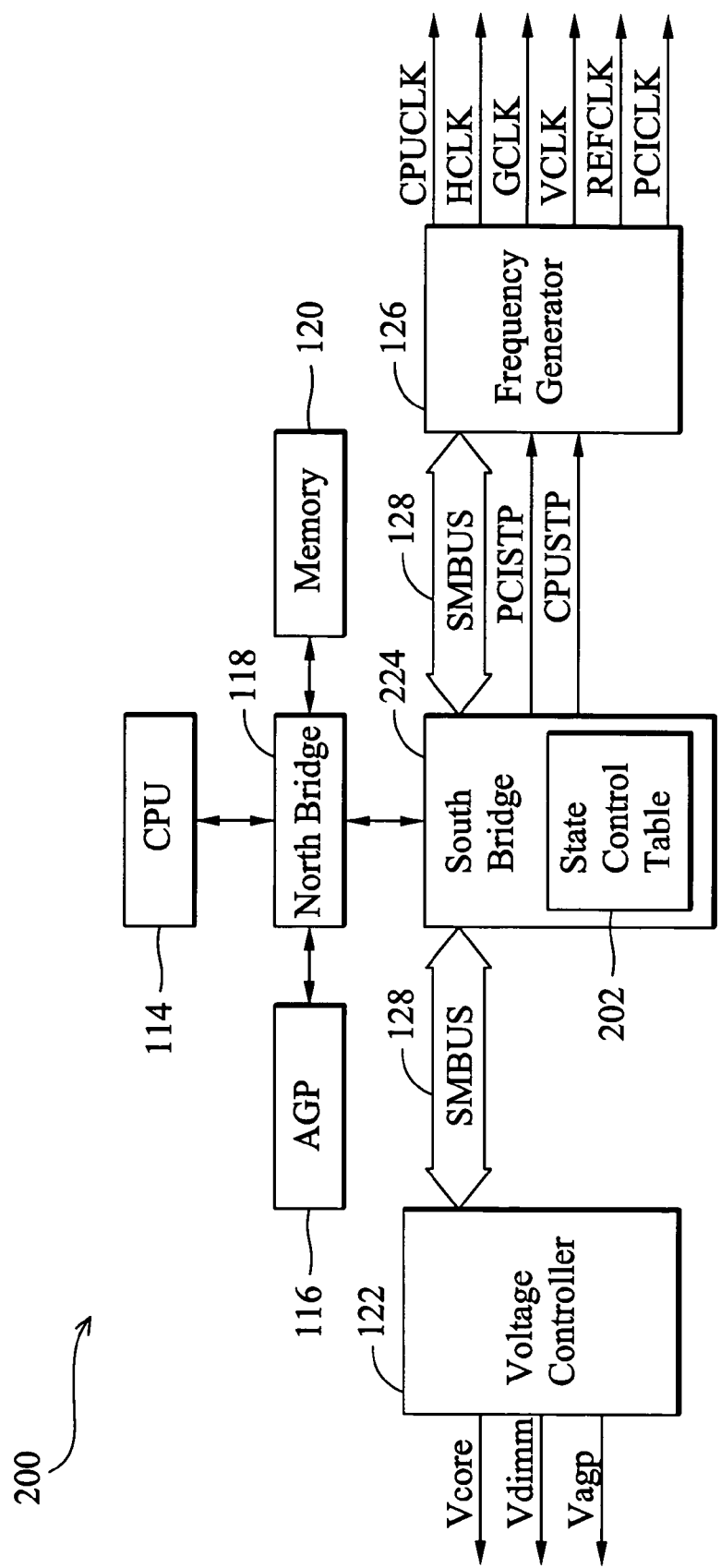
FIG. 2 is a block diagram of a computer system 200 according to an embodiment of the invention.

FIG. 2 shows computer system architecture 200 according to an embodiment of the invention. Rather than software control, a set of registers, state control table 202 is added to Southbridge 224 as an extension, for reference of power management. Northbridge 118, among system components, handles state information of CPU 114, AGP 116, memory 120 and Southbridge 224, and further comprises information unknown to CPU 114, making it the most suitable candidate to serve as a system monitor. Utilization information of CPU 114, memory 120 and AGP 116 are obtained by the Northbridge 118 and sent to the Southbridge 224. Through Northbridge 118, the utilization information can be presented as digital values synchronized with corresponding system components in real-time, such that no additional routine functions are required for sampling among numerous data to obtain the utilization information. After the utilization information is transferred from the Northbridge 118 to the Southbridge 224, it is categorized into classes, such as "HIGH", "NORMAL", "LOW", "LOWEST", as shown is FIG. 3.

FIG. 3 shows the state control table 202 according to an embodiment of the invention. The state control table 202 defines relationships between various work states and corresponding control signals, for internal components within the computer system, such as memory 120, CPU 114 and so on. For example, the state control table 202 can define when the work state of a CPU is "LOW", a corresponding control signal "−50%" for operating frequency of the CPU 114 can then be read and delivered, thereby the operation of the CPU 114 can be regulated. The state control table 202 may comprise more detailed lookup tables corresponding to various system components therein. For example, in addition to frequencies, the state control table 202 may comprise relationships between other kinds of control signal and work states, such as voltages or currents. The state control table 202 can be generated by the Southbridge 224 automatically according to the system specification when power is on, and can be manually programmed through an external input. Based on the utilization information from Northbridge 118 and the state control table 202 in Southbridge 224, a corresponding control signal is generated by the Southbridge 224 and transferred to voltage controller 122 and frequency generator 126 through the SMBUS 128. The voltage controller 122 is capable of tuning operating voltages of CPU 114, AGP 116 and Northbridge 118. By receiving the control signal through SMBUS 128, the voltage controller 122 increases or decreases the operating voltage supplying a corresponding system component accordingly. Similarly, the frequency generator 126 controlling operating frequency of each system component generates the increased or reduced frequency for the corresponding system component accordingly.

As shown in FIG. 2, for CPU 114, operating voltages may be 3.3V, and operating frequency is 2.0 G (Gigahertz). In a column of state control table 202 defines that, when the work state of CPU 114 is HIGH, the Southbridge 224 generate a control signal for increasing voltage by 1% and frequency by 10%. When the Northbridge 118 assesses the utilization of CPU 114 as 100% and transfers the information to Southbridge 224, the Southbridge 224 looks up the utilization in the state control table 202 and generates the corresponding control signal. Through SMBUS 128 the control signal generated by Southbridge 224 is delivered to voltage controller 122 and frequency generator 126, thereby correspondingly increasing voltage 3.33V and increasing frequency 2.2 G to the CPU 114. The capability to overclock may be provided when needed, increasing performance in addition to power consumption regulation.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power management method for regulating power consumption of a system comprising a Northbridge and a Southbridge, comprising:

providing a state control table in the Southbridge for defining relationships between a plurality of work states and a plurality of control signals;

detecting utilization of an internal component actively by the Northbridge and categorizing the utilization into a corresponding work state;

looking up the state control table to generate a control signal corresponding to the work state; and delivering the control signal to adjust the utilization.

2. The method as claimed in claim 1, wherein providing the state control table comprises:

defining the plurality of work states; and defining the plurality of control signals corresponding to the work states.

3. The method as claimed in claim 2, wherein the state control table is a voltage control table, and the control signal is delivered to adjust a voltage.

4. The method as claimed in claim 2, wherein the state control table is a frequency control table, and the control signals are delivered to adjust operating frequency.

5. The method as claimed in claim 1, wherein delivering the control signal is delivered through a system management bus (SMBUS).

6. A power management system capable of regulating power consumption in computer systems without using software protocols, comprising: a Northbridge for actively assessing an utilization of an internal component;

a Southbridge comprising a state control table to generate a control signal according to the utilization;

a system management bus for delivering the control signal; and a controller for adjusting the utilization of the internal component according to the control signal.

7. The power management system as claimed in claim 6, wherein the Southbridge further categorizes the utilization into a corresponding work state, and generates the control signal by looking up the work state from the state control table.

8. The power management system as claimed in claim 6, wherein the system management bus conforms to an Advanced Configuration and Power Interface standard.

9. The power management system as claimed in claim 6, wherein the state control table is established by the Southbridge reading predetermined configurations in a firmware.

10. The power management system as claimed in claim 6, wherein:

the state control table is a voltage control table; and the controller is a voltage controller receiving the control signal and adjusting a voltage driving the internal component accordingly.

11. The power management system as claimed in claim 6, wherein:

the state control table is a frequency control table; and the controller is a frequency generator receiving the control signal and adjusting operating frequency of the internal component.

\* \* \* \* \*